March 10, 1942.  R. R. SEARLES  2,275,996

BEARING SEAL

Filed Jan. 5, 1939

INVENTOR
RAYMOND R. SEARLES
BY
ATTORNEYS.

Patented Mar. 10, 1942

2,275,996

UNITED STATES PATENT OFFICE 2,275,996

BEARING SEAL

Raymond R. Searles, New Britain, Conn., assignor to The Fafnir Bearing Company, New Britain, Conn., a corporation of Connecticut Application January 5, 1939, Serial No. 249,394

1 Claim. (Cl. 286—5)

My invention relates to a bearing seal.

It is an object of my invention to provide an improved form of seal which is simple in construction, easy to apply, and effective in use.

It is another object to provide an improved form of seal which will be effective in excluding foreign matter from an anti-friction bearing.

Another object is to provide an improved form of seal for effectively holding lubricant in an anti-friction bearing and excluding foreign matter therefrom.

Other objects and various features of novelty and improvement will be hereinafter pointed out or will become apparent to those skilled in the art.

In the drawing which shows, for illustrative purposes only, preferred forms of the invention—

The conventional bearing in the particular form shown comprises an outer bearing ring 5, and inner bearing ring 6, with interposed anti-friction bearing members such as balls 7. The rings 5—6 have ball races for receiving the balls which latter hold the two rings in unit handling relationship. The outer ring 5 has a spherical outer surface to be received in a correspondingly formed ring or housing to take care of shaft misalignment, as will be understood. The bearing is of the so-called long inner ring type, wherein the inner ring 6 has an extended longitudinal bearing surface on the shaft to be received thereby.

Figure 1:
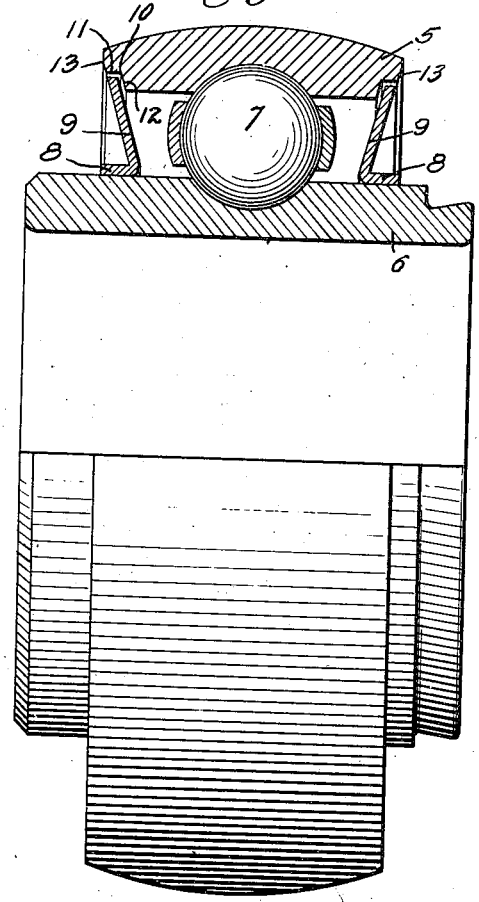
Fig. 1 is an edge view in quarter section of a ball bearing, illustrating one form of my improved seal applied thereto.

The improved seal shown in Fig. 1 includes a disk-like seal member preferably of sheet metal extending across the space between the two rings for substantially sealing the same and preventing the entry of foreign matter to the bearing surfaces. As illustrated, the seal comprises a sheet metal sleeve member 8 tightly frictionally fitting about the inner ring 6. The sleeve 8 has an outwardly directed circumferentially extending flange member 9. The flange member 9 preferably extends radially outwardly as well as away from the balls 7. In other words the flange 9 may be said to be flared outwardly and away from the balls 7. The outer ring in the form shown is provided at the edge with a recess 10 for receiving the outer edge of the flange 9. The recess may have a longitudinally extending wall 11 and preferably has a flared wall 12 lying substantially parallel to the adjacent surface of the flange 9. Furthermore, with a seal of about the proportions shown, the outer edge of the ring as shown at 13 may be chamfered on a line forming substantially a continuation of the outer surface of the flange 9. The surfaces of the recess 10 and the flange 9 are in clearance and sealing relation to each other.

When the inner ring 6 is rotated it will be clear that any foreign matter striking the flange 9 will be centrifugally thrown off and away from the bearing and the sealing space between the flange 9 and the recess 10. Furthermore, since the bearing is preferably filled with grease some grease will collect in the space between the flange and the recess 10 and effectively prevent the entry of foreign matter and any grease leaking past the seal will tend to wash out any foreign matter which may have lodged at or near the seal space. In the form shown the bearing has duplicate seals at the sides so as to protect it completely.

Figure 2:
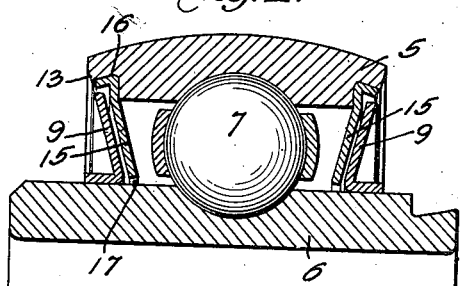
Fig. 2 is a fragmentary view similar to Fig. 1, illustrating a modification.

In the form shown in Fig. 2 the bearing and various parts are substantially the same as those heretofore described and have been given corresponding reference characters. In the form shown in Fig. 2, however, I provide an additional seal plate 15 secured to the outer bearing ring. The plate 15 is preferably spun or swaged at its outer edge into an undercut groove or counterbore 16 in the outer bearing ring and the flange portion 15 is preferably flared radially inwardly and toward the anti-friction bearing members and lies substantially parallel to the flange 9 carried by the inner bearing ring. The flange 15 extends into close proximity to the inner bearing ring as shown at 17. The inner seal member 15 carried by the outer bearing ring serves as a barrier or support for the grease within the bearing and the clearance or sealing space between the seal members 9—15 is relatively long so that any foreign matter will be effectively retarded in working its way in between the two seal plates and into the bearing space. The rotating flinger or seal plate 9 will be effective in centrifugally throwing foreign matter out of the seal space between the plates. Furthermore, any grease or lubricant passing the seal clearance 17 and finding its way into the space between the plates 9—15 will tend to further seal that space and prevent the entry of foreign matter. Duplicate seals may be provided at the sides of the bearing, as heretofore described, so that the bearing will be completely protected against the entry of foreign matter and against loss of lubricant.

While the invention has been described in considerable detail and preferred forms illustrated, it is to be understood that various changes may be made within the scope of the invention as defined in the appended claim.

I claim:

The combination with a pair of rings disposed one within the other and held in radially spaced apart relationship and against substantial relative movement axially, the outer of said rings having a recess in one edge thereof, of an annular flat disk-like barrier seal member having its outer edge secured in said recess and flaring radially and axially inwardly to such an extent that its inner circumferential edge is substantially in lubricant sealing proximity to the outer circumferential surface of the inner of said rings, a second seal member carried by said inner ring and comprising a sleeve portion tightly fitting the outside of said inner ring circumferentially, said sleeve portion at its inner end having a flinger flat flange portion flaring radially and axially outwardly and lying throughout in sealing proximity to, but in clearance relation with, the outer surface of said seal member carried by said outer ring.

RAYMOND R. SEARLES.